US011249901B2

(12) United States Patent
Danilov et al.

(10) Patent No.: US 11,249,901 B2
(45) Date of Patent: Feb. 15, 2022

(54) OWNERSHIP-BASED GARBAGE COLLECTION OF DATA

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 151 days.

(21) Appl. No.: 16/213,175

(22) Filed: Dec. 7, 2018

(65) Prior Publication Data

US 2020/0183829 A1   Jun. 11, 2020

(51) Int. Cl.
*G06F 16/00* (2019.01)
*G06F 12/02* (2006.01)
*G06F 16/22* (2019.01)
*H04L 29/06* (2006.01)

(52) U.S. Cl.
CPC ...... *G06F 12/0253* (2013.01); *G06F 16/2246* (2019.01); *G06F 2212/1044* (2013.01); *H04L 67/42* (2013.01)

(58) Field of Classification Search
CPC .................................................. G06F 16/2246
See application file for complete search history.

(56) References Cited

U.S. PATENT DOCUMENTS

| 8,527,544 | B1* | 9/2013 | Colgrove | G06F 3/0608 707/791 |
| 10,657,048 | B2* | 5/2020 | Hsu | G06F 3/068 |
| 2011/0219106 | A1* | 9/2011 | Wright | G06F 3/067 709/223 |
| 2012/0066193 | A1* | 3/2012 | King | G06F 12/0269 707/704 |
| 2016/0232059 | A1* | 8/2016 | Khurange | G06F 16/1752 |
| 2017/0177473 | A1* | 6/2017 | Danilov | G06F 3/0652 |

* cited by examiner

*Primary Examiner* — Khanh B Pham
(74) *Attorney, Agent, or Firm* — Amin, Turocy & Watson, LLP

(57) ABSTRACT

The described technology is generally directed towards data storage using a node cluster, and garbage collecting unused chunks (data storage units) in the cluster based on which node owns the particular unused chunks. A node determines which chunks are in use, and exchanges datasets identifying those chunks with other nodes such that the other nodes know which of the chunks that they own are in use. When a node obtains the dataset identifying the chunks in use, the node determines the chunks not in use by a difference of those owned and those in use. This difference dataset is used to garbage collect owned, unused chunks. Garbage collection via this technology is able to be performed in a single cycle.

20 Claims, 14 Drawing Sheets

OWNERSHIP-BASED GARBAGE COLLECTION OF DATA

TECHNICAL FIELD

The subject application generally relates to data storage, and, for example, to a data storage system of nodes that garbage collects chunk data based on data structure (e.g., tree) ownership by nodes, and related embodiments.

BACKGROUND

Contemporary cloud-based data storage systems, such as ECS (formerly known as ELASTIC CLOUD STORAGE) provided by DELL EMC, can be based on a cluster of nodes that each own some part of the stored data (and can store redundant data owned by other nodes for data protection purposes) in storage devices. For example, user data can be stored in a repository and the metadata (system metadata and metadata used to locate the user data) associated with the user data stored in search trees owned by a given node. The metadata is thus arranged in trees such as B+ trees (the tree data is stored in chunks), and partitioned among the nodes such that each tree is owned by one node that is responsible for managing that tree. Note that a node may own more than one tree.

In general, disk space is partitioned into a set of blocks of fixed size called chunks. The information maintained in the cloud-based data storage system, including the user data and the various metadata, is stored in these chunks; chunk content is modified in append-only mode; when a chunk becomes sufficiently full, that chunk gets sealed and becomes immutable.

Eventually, due to object deletion and the like, a sealed tree chunk becomes unused, in that no node within the node cluster references a tree element that is part of the unused tree chunk. In such a state, the unused tree chunk can be garbage collected and its space reclaimed. However, reference counting by itself is not deemed sufficiently reliable, and thus a chunk that appears to be unused based on reference counting is added to a list of garbage collection candidates to be tested in a process referred to as verification; verification traverses trees to detect tree elements that are currently referenced and, therefore, live to ensure that no live tree element is stored in a candidate chunk, in which case that chunk is removed as a candidate. Candidate chunks that do pass verification are deleted and their capacity is reclaimed.

With the above verification-based garbage collection technique, verification of garbage collection candidates takes significant time, and the garbage collector cannot verify all potential candidates in one cycle. As a result, complete garbage collection for a relatively large node cluster after significant deletes can take on the order of months.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
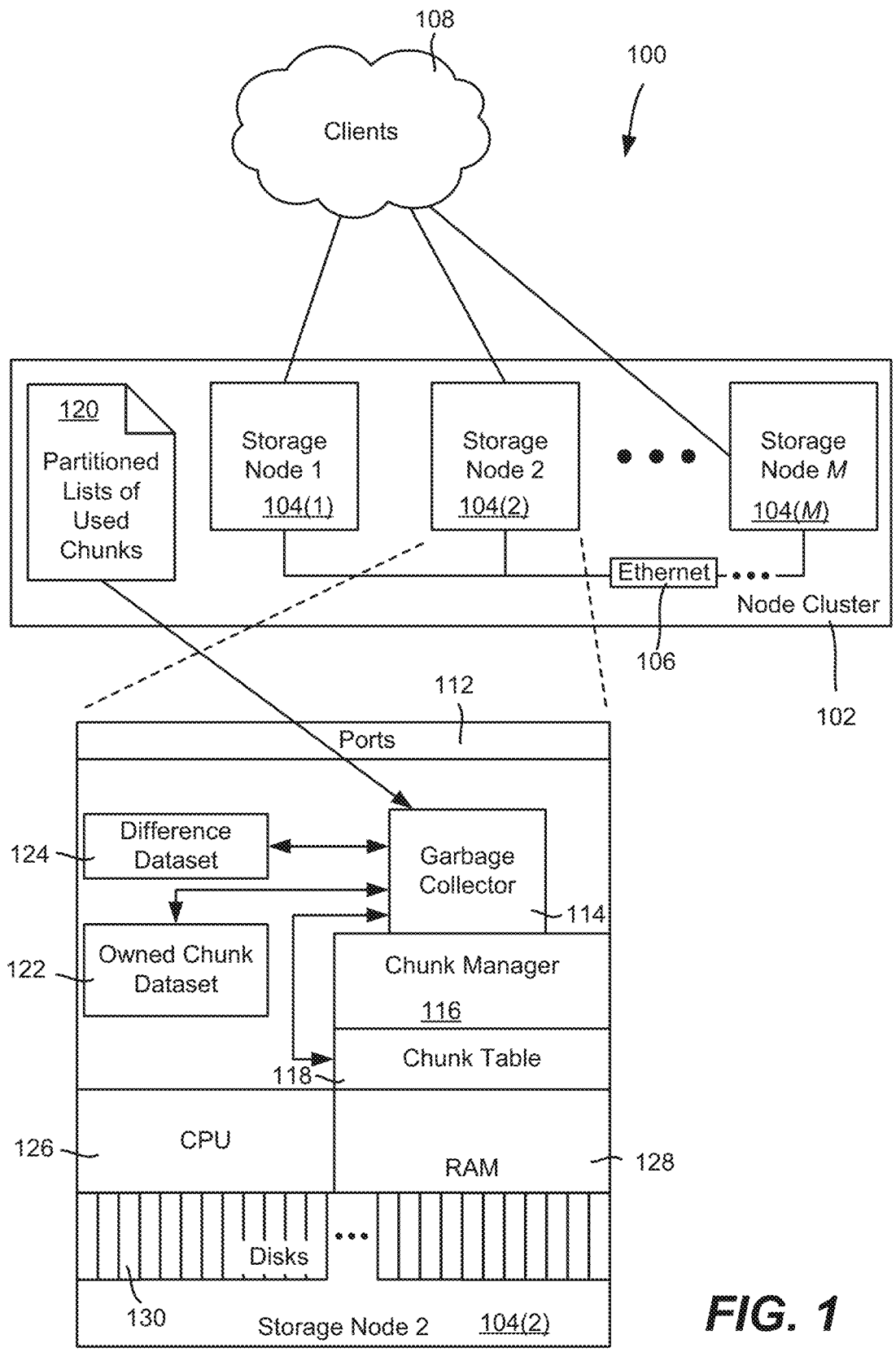
FIG. 1 is an example block diagram representation of part of a cloud data storage system including nodes, in which a garbage collector garbage collects owned and unused chunks, according to one or more example implementations.

Various aspects of the technology described herein are generally directed towards garbage collecting chunks that are unused based on ownership of those chunks. An owning node obtains information (a dataset) of chunk identifiers representing which of its owned chunks are in use by other nodes, as well as in use by itself. A difference dataset representing those chunks that are owned but not in use in any data structure (e.g., tree) element is determined from a dataset of those owned and the dataset of those in use. Chunks that are owned and not in use are garbage collected, e.g., deleted, with their space reclaimed. In part because each of the various nodes garbage collects its own unused chunks, garbage collection can occur in one garbage collection cycle.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As will be understood, the implementation(s) described herein are non-limiting examples, and variations to the technology can be implemented. For instance, examples are based on the ECS data storage system, however the technology described herein can be used by any data storage system that has multiple nodes. Moreover, while metadata trees and chunks are described, it is understood that any type of chunks that are owned and unused can be identified and garbage collected based on the technology described herein, such as user chunks or other units of data that are not necessarily referenced by a tree of metadata, but, for example, referenced by some other data structure (e.g., hash maps). As such, any of the embodiments, aspects, concepts, structures, functionalities, implementations and/or examples described herein are non-limiting, and the technology may be used in various ways that provide benefits and advantages in data storage technology and garbage collection in general.

Aspects of the subject disclosure will now be described more fully hereinafter with reference to the accompanying drawings in which example components and operations are shown, and wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure. Thus, the subject disclosure may be embodied in many different forms and should not be construed as limited to the examples set forth herein.

In ECS, disk space is partitioned into a set of blocks of fixed size called chunks. The various types of data, including user data and various types of metadata, are stored in chunks. There are different types of chunks, one type per capacity user. In particular, user data is stored in repository chunks, while the metadata is stored in directory tables, where each directory (DT) table is a set of key-value search trees. Chunks of each type can be shared. For instance, one repository chunk may contain segments of several user objects, one tree chunk may contain elements of several trees, and so on.

Trees are thus stored in tree chunks. In one or more implementations, each tree element is stored in a single page, wherein each page occupies continuous space of a single chunk. One tree chunk can contain elements of different trees, and a tree chunk managed (owned) by a node can contain elements of a tree owned by another node. As set forth above, chunk content is modified in append-only mode; when some chunk becomes sufficiently full, the chunk gets sealed. The content of a sealed chunk is immutable.

In one or more implementations, each directory table comprises 128 B+ trees, each B+ tree comprising a root, internal nodes, and leaves. Note that in a B+ tree, each tree node contains only keys, and the leaves maintain key-value pairs. As described above, when a storage service needs to manage system and/or user metadata, the service maintains (keeps and accesses) the metadata in a directory table. A hash function is used to derive a home tree/partition for a given key, and thus each tree is owned by one cluster node; (even though the elements of that tree can be in a tree chunk owned by another node).

One aspect of partitioning is that a node can own a chunk but not use it and/or even store that chunk within its storage devices. This can be exemplified via a chunk manager (CM), which is a storage service of ECS storage services that manages chunks. A chunk manager keeps information about chunks in chunk table (CT), which is a DT. Given a chunk C and a partition P of a CT that keeps the system metadata for chunk C, there is some node N that owns partition P. Significantly, although the node N owns chunk C via partition P, the node N may contain zero bytes of chunk C data in its storage devices.

FIG. 1 shows part of a cloud data storage system 100 (such as ECS) comprising a node cluster) 102 of storage nodes 104(1)-104(M), in which each node is typically a server configured primarily to serve objects in response to client requests. The nodes 104(1)-104(M) are coupled to each other via a suitable data communications link comprising interfaces and protocols, such as represented in FIG. 1 by Ethernet block 106.

Clients 108 make data system-related requests to the cluster 102, which in general is configured as one large object namespace; there may be on the order of billions of objects maintained in a cluster, for example. To this end, a node such as the node 104(2) (shown enlarged in FIG. 1 as well) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node, such as the node 104(2), includes instances of data services, which can include a copying garbage collector 114, and a chunk manager 116 that manages one or more chunk tables (118). Note that some of data services can be per-cluster, rather than per-node. As will be understood, based on partitioned lists of used chunks 120, the garbage collector 114 can determine unused chunks, based on a dataset 122 of the chunks that the node 104(2) owns, and a difference dataset 124 comprising those chunks owned (in total based on owned trees or other data structures) versus those chunks that are owned and in use.

In FIG. 1, a CPU 126 and RAM 128 are shown for completeness; note that the RAM 126 may comprise at least some non-volatile RAM. The node 104 (2) includes storage devices such as disks 128, comprising hard disk drives and/or solid-state drives, or any other suitable type of storage resource.

Figure 2:
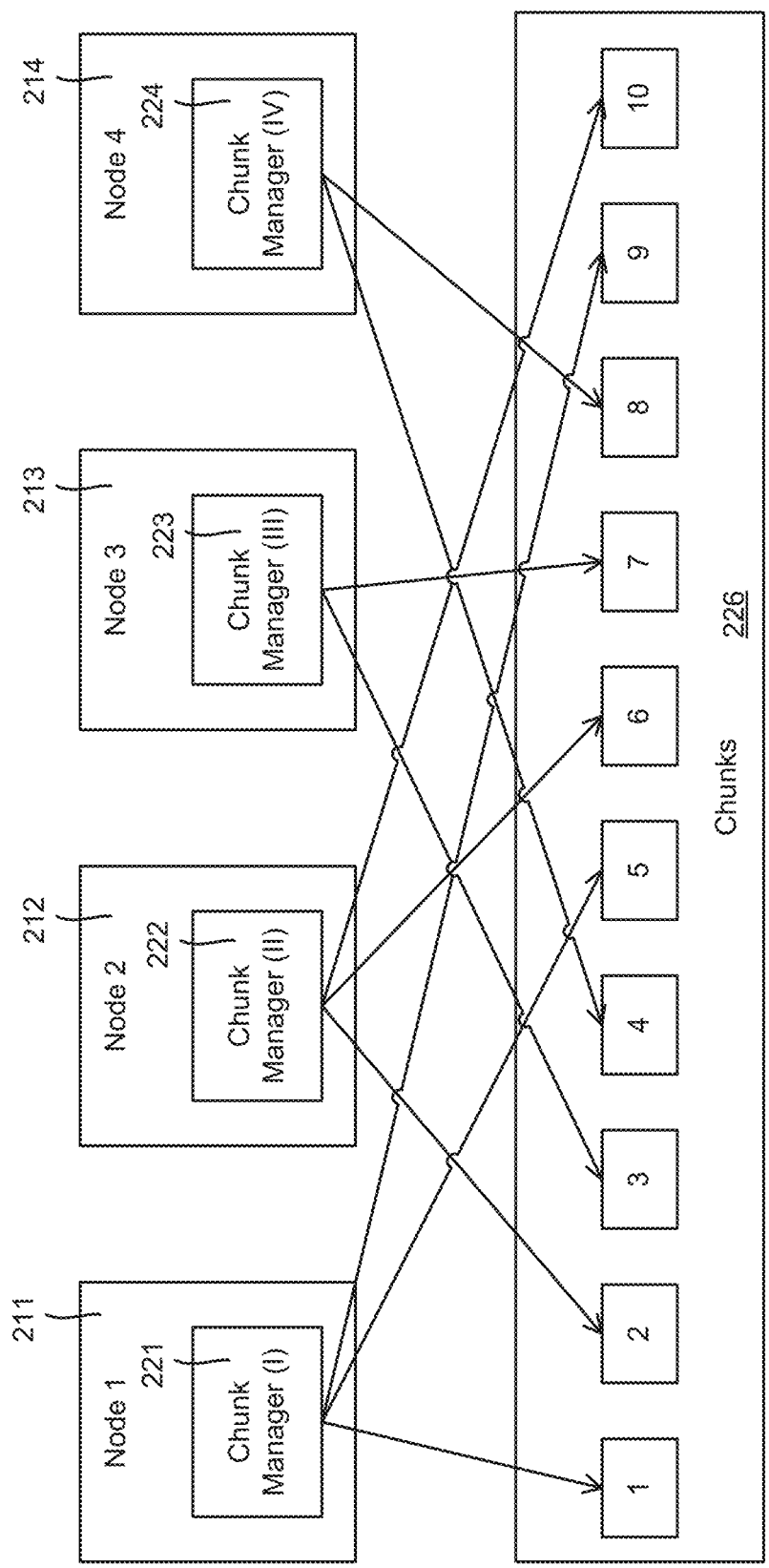
FIG. 2 is an example block diagram representation of chunks owned by nodes and managed by respective chunk managers, in which the chunks are possible candidates for garbage collection, in accordance with various aspects and implementations of the subject disclosure.

With respect to garbage collection technology as described herein, as represented in the example four-node cluster with four chunk table partitions of FIG. 2, there is a cluster that comprises nodes 211-214. In this example, there are ten chunks 226, e.g., identified by chunk identifiers (1-10). The arrows in FIG. 2 show which of the nodes 211-214/respective chunk manager instances 221-224 (one per node), via corresponding chunk table partitioning (Roman numerals (I)-(IV)), manage which chunks. Thus, in FIG. 2, it can be seen by the arrows that in this particular example, the node 1 labeled 211/chunk manager (I) 221 owns (manages) chunks 1, 5 and 9, the node 2 labeled 212/chunk manager (II) 222 owns chunks 2, 6 and 10, the node 3 labeled 213/chunk manager (III) 223 owns chunks 3 and 7, and the node 4 labeled 214/chunk manager (IV) 224 owns chunks 4 and 8.

Figure 3:
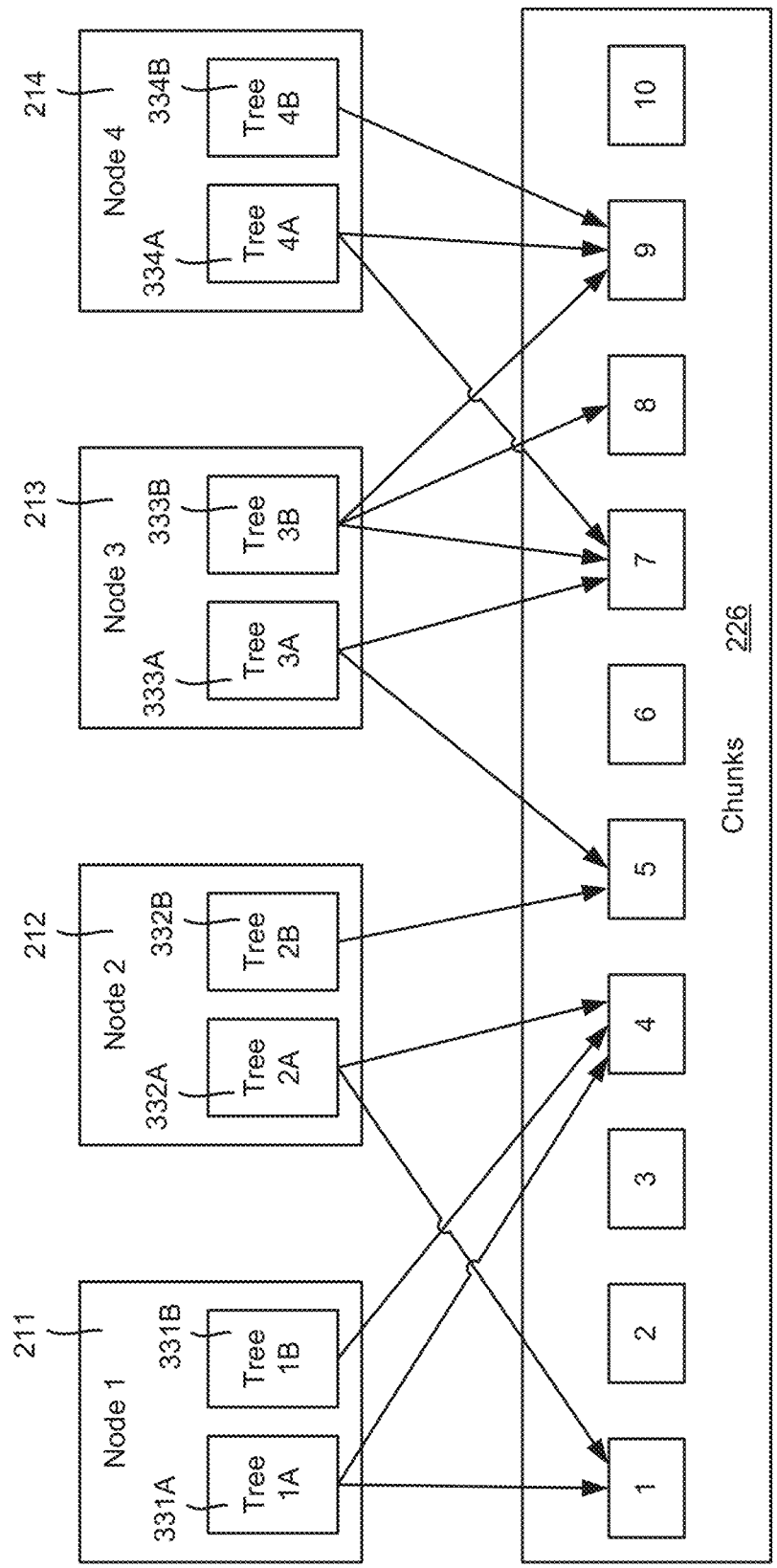
FIG. 3 is an example block diagram representation of chunks used by nodes, in which the unused chunks are ready for garbage collection, in accordance with various aspects and implementations of the subject disclosure.

Continuing with the example herein, as shown in FIG. 3, the cluster nodes 211-214 each owns two trees; that is, in FIG. 3 the node 1 (211) owns tree 1A labeled 331A and tree 1B labeled 331B, the node 2 (212) owns tree 2A labeled 332A and tree 2B labeled 332B, and so on. As set forth herein, trees are only an example of one suitable data structure, and instead of (or in addition to) trees, other data structures (e.g., hash maps) can be used to reference and maintain metadata.

When it is time to start the garbage collector, the arrows in FIG. 3 shows which trees use (have data in) which chunks in this example. As can be seen from FIGS. 2 and 3, the node 1 (211) owns nodes 1, 5 and 9 (FIG. 2), and has data in chunk ID 1 (owned by node 1 (211) and chunk ID 4; (chunk ID 4 is owned by the node 4 (214)). Thus, it can be seen that the tree 1A labeled 331A of the node 1 labeled 211 uses chunk 1, which it also owns, and chunk 4, which node 211 does not own. The tree 1B labeled 331B of node also uses chunk 4, owned by node 214, as does the tree 2A 332A of the node 212. Thus, as shown in FIGS. 2 and 3, the trees of the various nodes 211-214 use various chunks 226 labeled 1-10, some chunks(s) of which can be owned by the node that uses that chunk, while other(s) of which can be owned by one or more other nodes.

Figure 4:
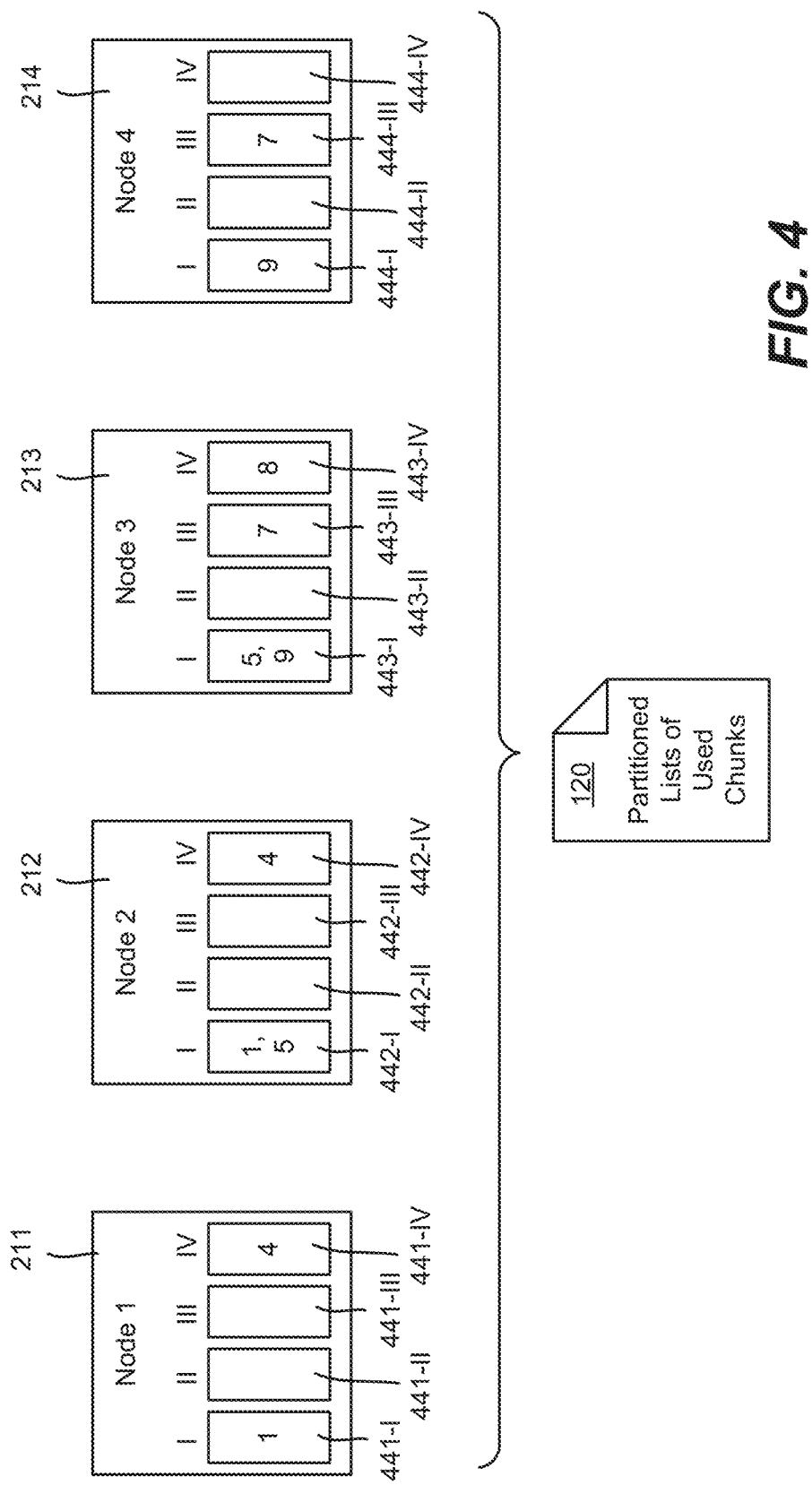
FIG. 4 is an example block diagram representation of data structures (e.g., lists) of chunks used by nodes, in which the used chunks are not to be garbage collected, in accordance with various aspects and implementations of the subject disclosure.

As represented in FIG. 4, each node traverses its trees or other data structures to produce a list of chunks in use by that node. Note that a chunk that is not sealed is still considered in use; (if there is any other reason to not garbage collect a particular chunk, that chunk can also be considered in use). Each node's main list is partitioned using the chunk table's hash function, so that a list is obtained for each other node, as well as the node itself. Thus, from FIG. 2, node 1 owns chunks 1, 5 and 9, and from FIG. 3 uses chunks 1 and 4; when hashed below into partitioned lists of chunks in use as in FIG. 4, the node 211 has four lists 441-I-441-IV, with each list corresponding to one of the nodes 211-214. As can be seen, the partitioned lists 441-I, 441-II, 441-III and 441-IV are generated by node 1 (211), the partitioned lists 442-I, 442-II, 442-III and 442-IV are generated by node 2 (212), the partitioned lists 443-I, 443-II, 443-III and 443-IV are generated by node 3 (213), and the partitioned lists 444-I, 444-II, 444-III and 444-IV are generated by node 4 (214). These lists are persisted, e.g., into the partitioned lists of used chunks 120 (although it should be noted that for garbage collection, a node need not make available to other nodes its owned list of chunks in use by itself, e.g., the node 1 (211) can locally maintain the partitioned list 441-I because no other node needs that list for garbage collection).

Figure 5:
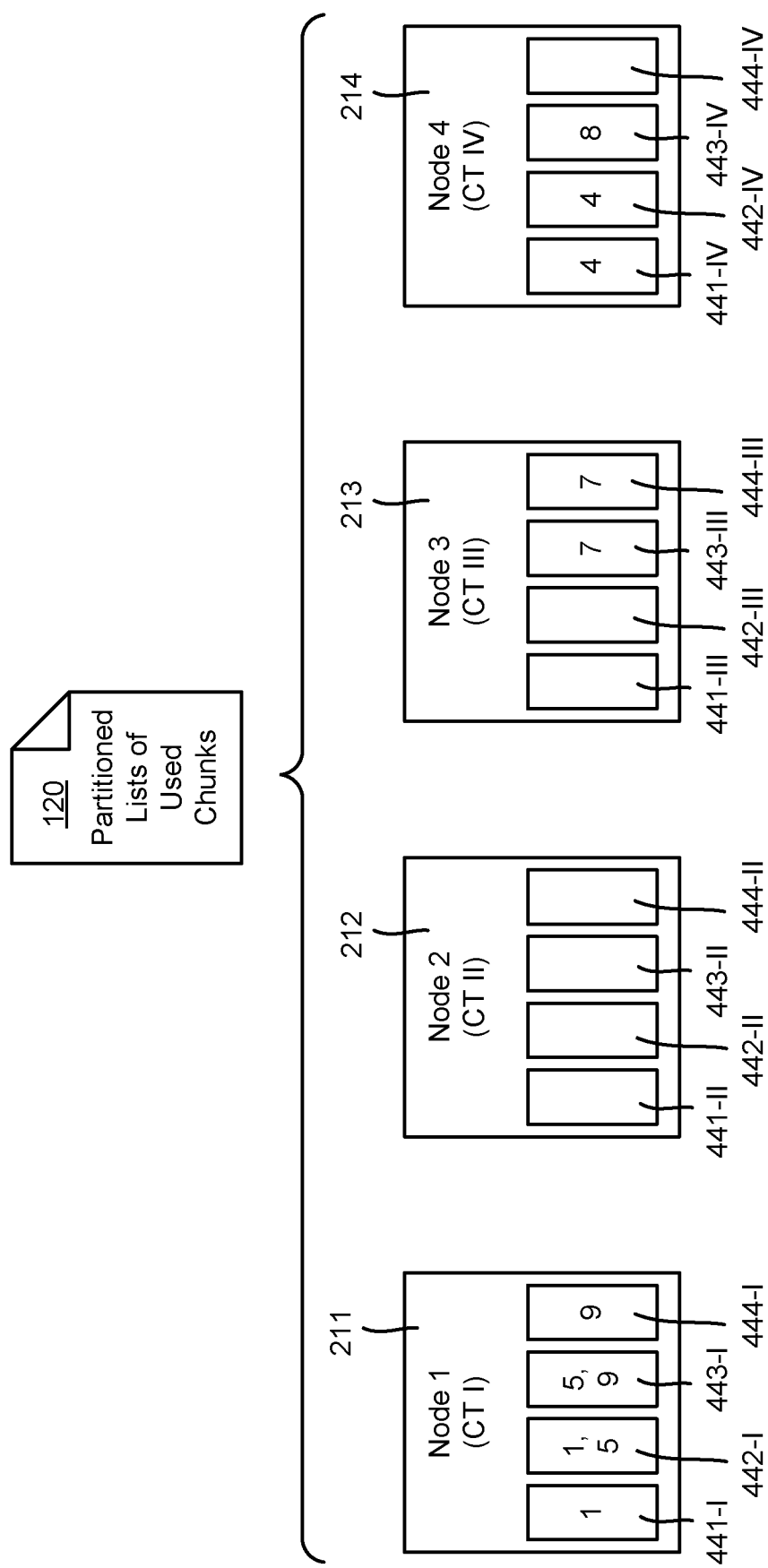
FIG. 5 is an example block diagram representation of data structures (e.g., lists) of chunks owned by nodes that are also in use, in which the chunks in use are not to be garbage collected, in accordance with various aspects and implementations of the subject disclosure.

As shown in FIG. 5, each node 211-214 obtains the lists of chunks in use that are owned by that node. Empty lists are also obtained, so as to ensure that the other nodes have each traversed its trees (or other data structures). Thus, the node 1 (211) obtains partitioned lists 441-I, 442-I, 443-I and 444-I, the node 2 (212) obtains partitioned lists 441-II, 442-II, 443-II and 444-II, and so on. At this point, each node knows which of its owned chunks are in use. Note that the lists for node 1 (211) can only have chunk IDs of 1, 5 and 9, because those are the chunks owned by the node 1 (211). Similarly, because the node 2 (212) owns chunks 2, 6 and 10, the hashed lists 442-I, 442-II, 442-III and 442-IV for node 2 (212) could only contain chunk IDs of 2, 6 and 10 (although these lists are blank, because chunks 2, 6 and 10 are not in use). Likewise, because the node 3 (213) owns chunks 3 and 7, the hashed lists 443-I, 443-II, 443-III and 443-IV for the node 3 (213) can only contain blanks or chunk IDs of 3 and 7 (although only chunk 7 is in use). Lastly, the node 4 (214) owns chunks 4 and 8, so the partitioned lists 444-I, 444-II, 444-III and 444-IV for the node 4 (214) contain only a blank, a chunk ID 4 and/or a chunk ID 8.

Figure 6:
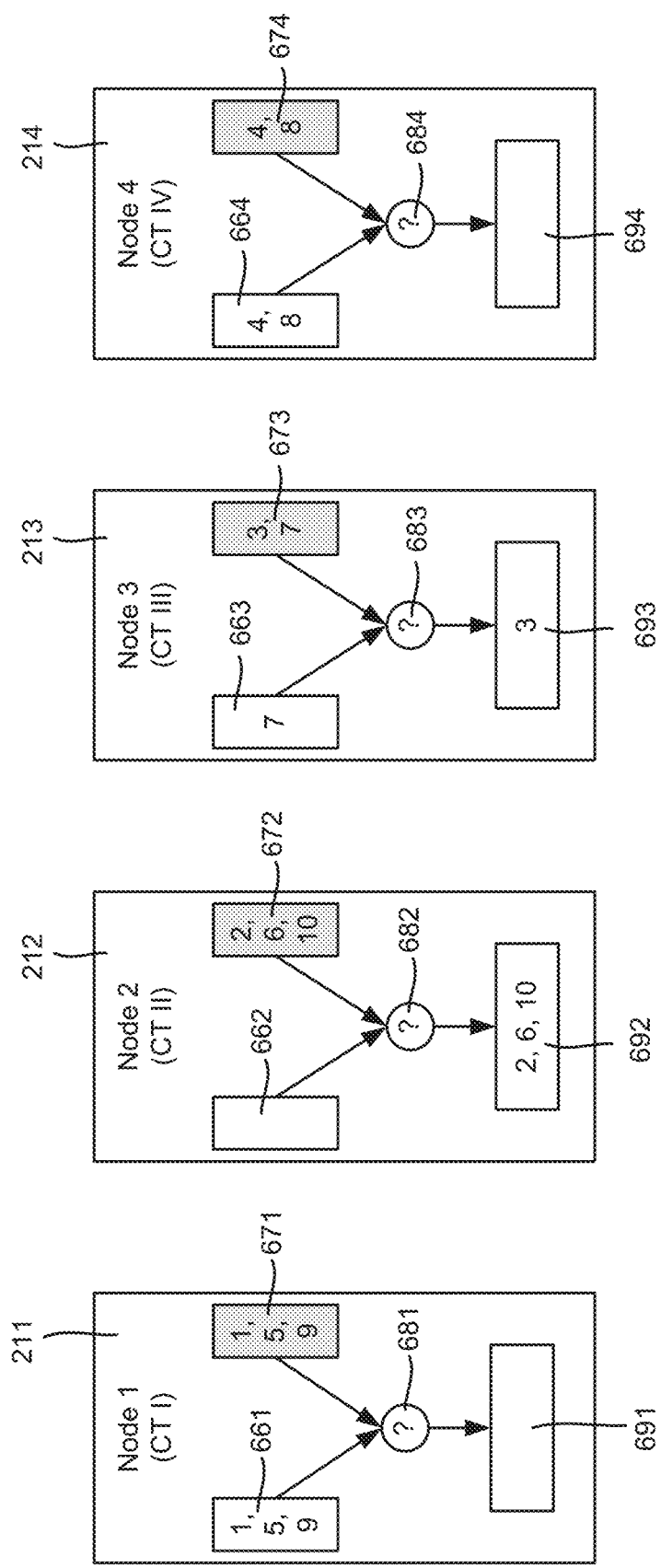
FIG. 6 is an example block diagram representation of nodes evaluating lists of owned chunks against lists of used chunks to determine unused chunks that are to be garbage collected, in accordance with various aspects and implementations of the subject disclosure.

Once a node has its lists of owned, used chunks, each node combines (unions) the chunk identifiers of its own lists. As shown in FIG. 6, the combined lists are vertical rectangles with white backgrounds, labeled 661-664. The unioning of the lists can be performed by sorting the chunk identifiers and removing duplicate identifiers.

In FIG. 6, the owned chunk lists in CT partitions (the chunks each node owns) are shown as vertical rectangles with grey backgrounds 671-674 in FIG. 6. To determine unused chunks, each node subtracts (represented by the circled question marks "?" labeled 681-684) its combined list of chunk identifiers in use from those that are owned by that node, to provide a difference dataset of owned, unused chunks. These datasets for the nodes 211-214 are shown in FIG. 6 as horizontal rectangles 691-694, respectively, each containing zero or more chunk IDs.

Figure 7:
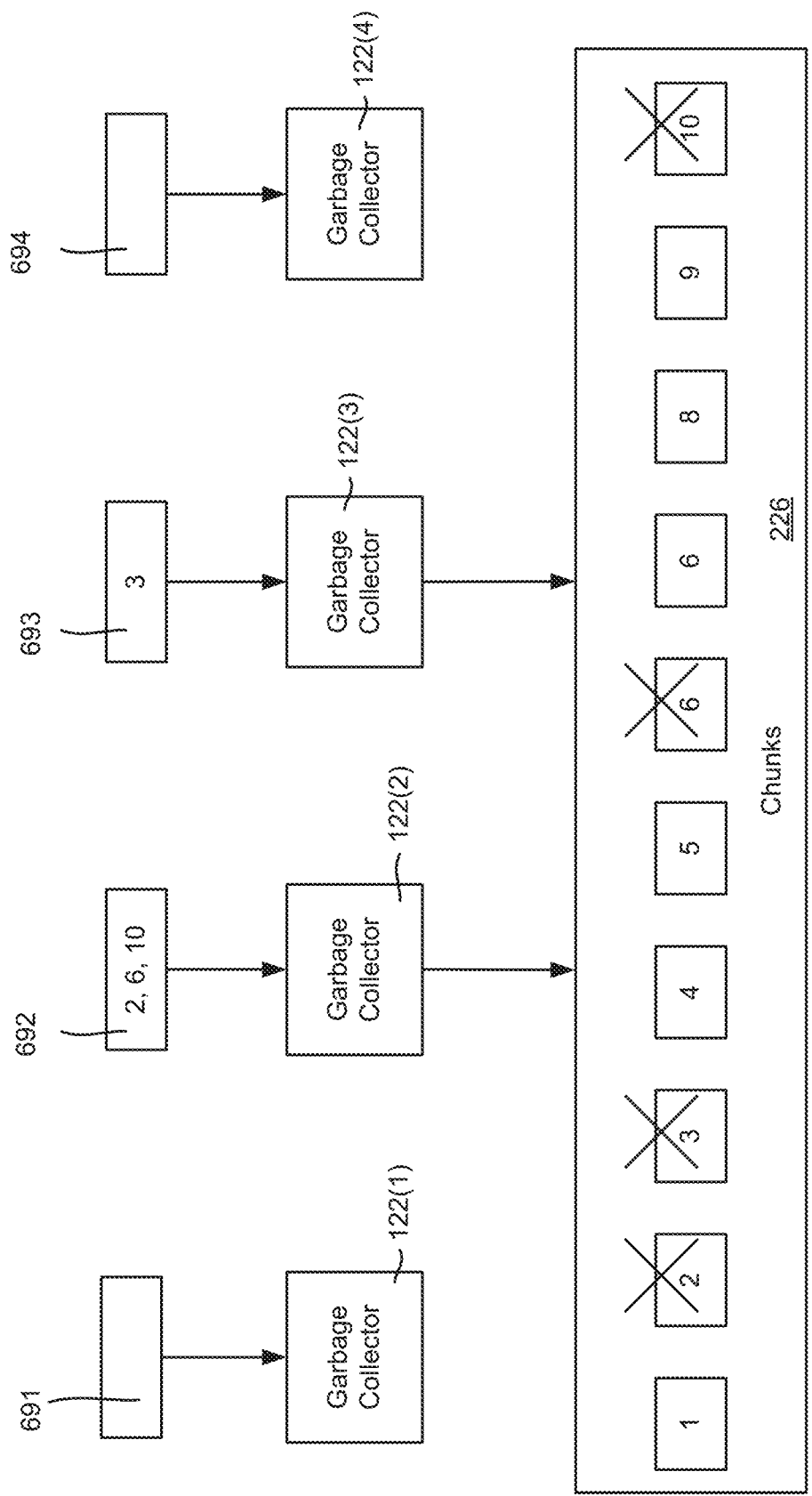
FIG. 7 is an example block diagram representation of nodes garbage collecting owned, unused chunks, in accordance with various aspects and implementations of the subject disclosure.

As shown in FIG. 7, these differences datasets 691-614 are used by respective garbage collector instances 122(1)-122(4) to garbage collect unused (sealed) chunks, that is, delete those chunks and reclaim their storage space. Note that it is alternatively feasible to have the difference datasets combined into a single list that is used by a cluster-wide garbage collector. Thus, continuing with the example of FIGS. 2-7, the unused chunks are 2, 3, 6 and 10, which are deleted (or marked for deletion) as represented by the crossed "X" over those chunks within the set of chunks 226.

Figure 8:
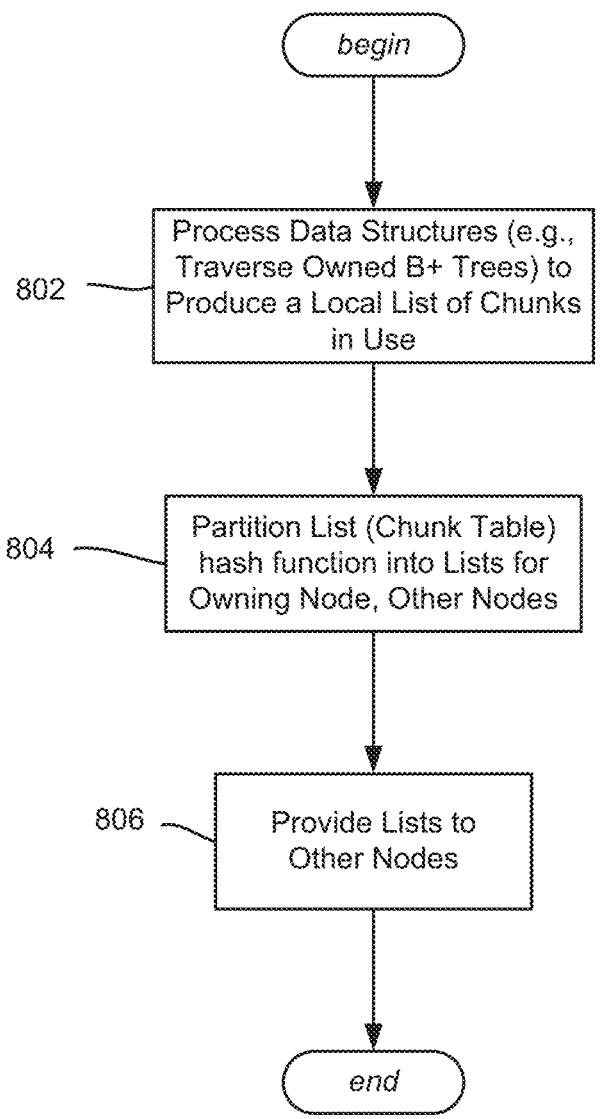
FIG. 8 is a flow diagram showing example operations of a node that owns data structures (e.g., trees) and uses chunks referenced by those data structures to determine chunks in use, in accordance with various aspects and implementations of the subject disclosure.

To summarize, as represented in FIG. 8, each cluster node/storage service traverse (traces) at operation 802 the B+ trees (and/or other data structures) owned by that node to produce a local list of chunks in use. Those are chunks that have at least one live element inside, for example. At operation 804, the list of used chunks may be partitioned using the chunk table hash function; note that in one more implementations in which there are 128 partitions, the initial list of used chunks corresponds to a union of 128 smaller lists. Operation 806 makes those lists available to the other nodes of the node cluster.

Figure 9:
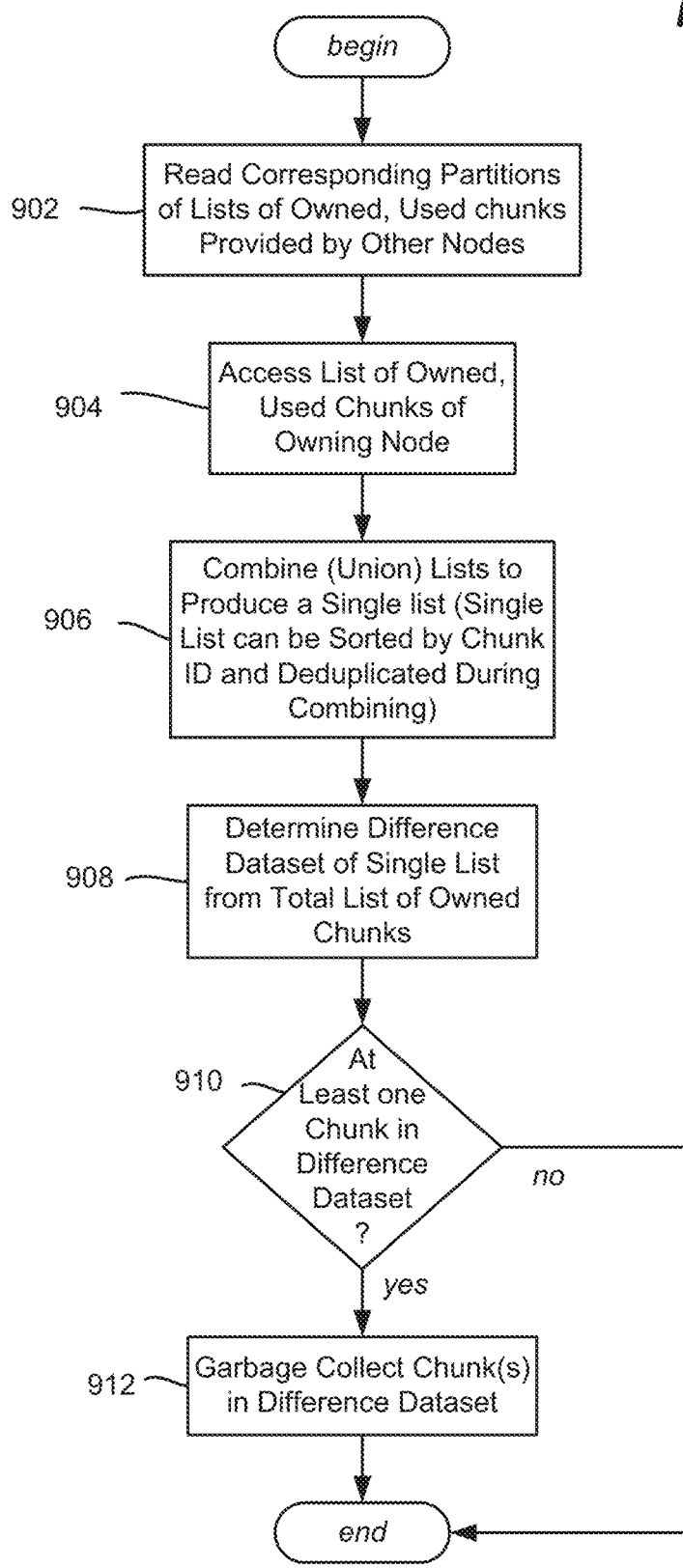
FIG. 9 is a flow diagram showing example operations of a node that owns chunks and uses data structures (e.g., lists) of chunks in use to determine owned, unused chunks for garbage collection, in accordance with various aspects and implementations of the subject disclosure.

Each cluster node that owns at least one chunk table partition performs the example operations of FIG. 9 for each chunk table partition it owns, beginning at operation 902 which represents the node reading the corresponding partitions of lists of used chunks from other nodes. Operation 904 represents a node obtaining its own list of used, owned nodes, e.g., from local storage.

Operation 906 represents combining the lists to produce a single list. The list may be sorted by chunk ID and deduplicated during combining. Operation 908 compares the combined list with the set of owned chunks to determine the difference dataset. Via operations 910 and 912, each owned chunk that is not in the combined list of used chunks and is ready for garbage collection (e.g., is sealed, etc.), can be deleted. The capacity occupied by deleted chunks can be reclaimed and reused.

As can be seen, described herein is am ownership-based technology for garbage collection, including for B+ trees. The technology allows collecting the garbage chunks in one cycle.

Note that reference counting can be used for scheduling purposes; that is, there is no need to start the garbage collector until there are a sufficient number (e.g., a threshold percentage, a count, etc.) of potentially reclaimable chunks detected using reference counting. Note that no set of garbage collection candidates needs to be defined for a garbage collection cycle. Instead, garbage chunks are reclaimed in one cycle, even if they do not appear to be garbage collection candidates from the reference counting point of view.

It should be noted that the technology can be configured to keep the size of a list of chunks in use reasonable. For example, a normal ECS cluster contains billions of tree elements, and if during tracing, a chunk in use is added to a list for each tree element, the resulting lists can be very large because of a large number of duplicates.

Measures can be used solve the problem with duplicates. For example, because trees in ECS are under a multi-version concurrency control policy, each tree leaf update means reallocation of at least N pages, where N is the current depth of the tree. In particular, the root changes after each update. As a result, there is a high probability of having tree elements from a leaf to a root in one chunk. Therefore, depth-first traversal of trees can be used to simplify duplicates detection.

Further, a per-tree small cache of recently added chunks in use can be maintained to easily detect and ignore duplicate chunk IDs during tree tracing/other data structure processing.

Another aspect related to persisting the lists of chunks in use, e.g., in the data structure 120 of FIG. 1. This can be accomplished by using dedicated system chunks created within a storage pool. Note that chunks in ECS are large enough so that such lists of chunks in use are generally rather short. It may be beneficial to store system lists in capacity blocks of a smaller size. For instance, blocks of chunk fragment size (e.g. chunk size divided by twelve) can be used.

Hard drives, e.g., which are not a part of the main storage capacity, can be used for maintaining the lists. These can be the hard drives of servers, which are used as ECS cluster nodes. Such hard drives are already used by ECS to store repositories with statistics, for example.

Figure 10:
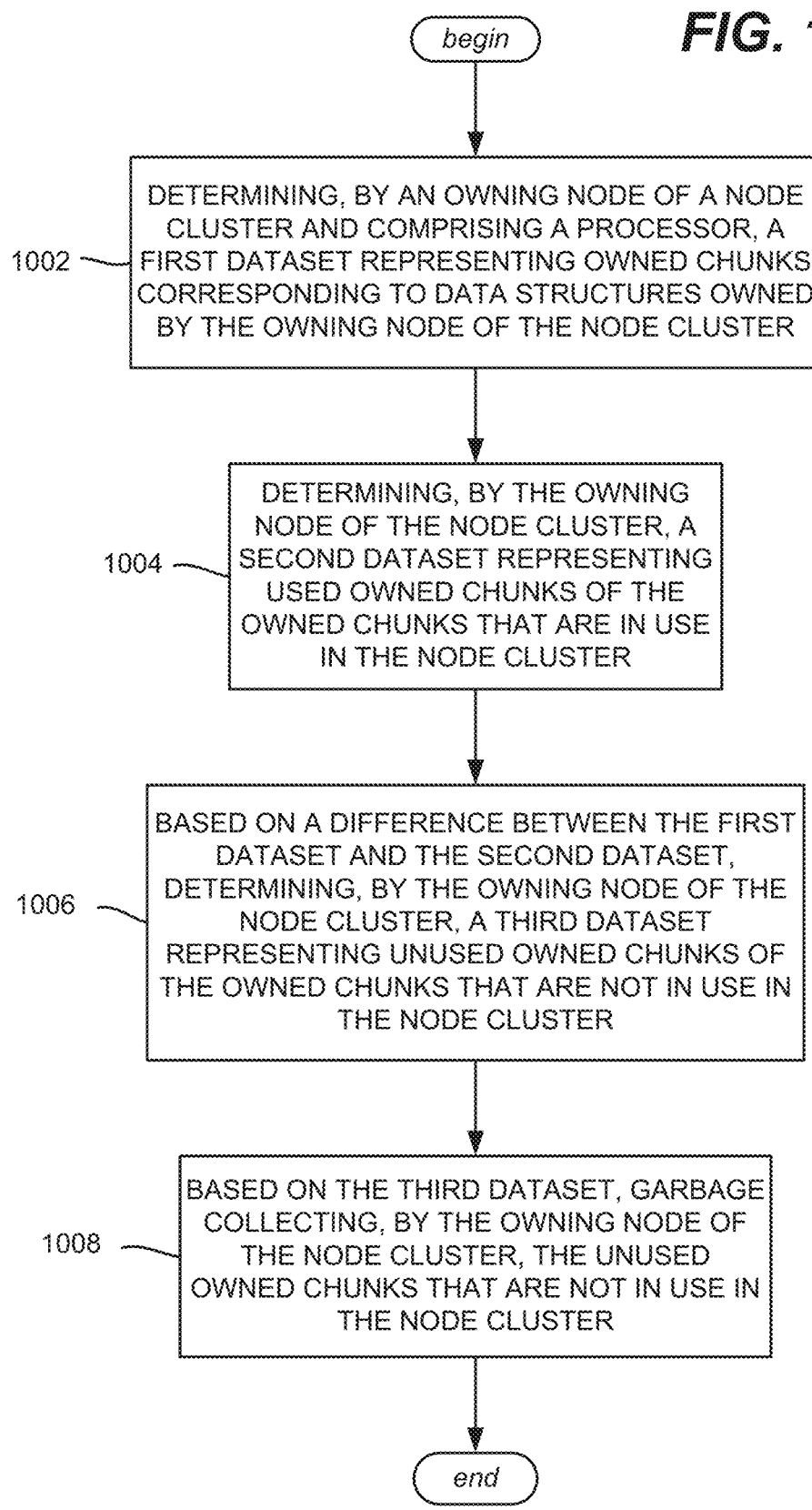
FIG. 10 is a flow diagram showing example operations related to garbage collecting owned and unused chunks, according to one or more example implementations.

One or more aspects, generally exemplified in FIG. 10, can comprise example operations, e.g., of a method. Operation 1002 represents determining, by an owning node of a node cluster and comprising a processor, a first dataset representing owned chunks corresponding to data structures owned by the owning node of the node cluster. Operation 1004 represents determining, by the owning node of the node cluster, a second dataset representing used owned chunks of the owned chunks that are in use in the node cluster. Operation 1006 represents, based on a difference between the first dataset and the second dataset, determining, by the owning node of the node cluster, a third dataset representing unused owned chunks of the owned chunks that are not in use in the node cluster. Operation 1008 represents, based on the third dataset, garbage collecting, by the owning node of the node cluster, the unused owned chunks that are not in use in the node cluster.

The data structures can comprise trees, and determining the second dataset representing the owned chunks that are in use in the node cluster can comprise determining a first group of zero or more identifiers corresponding to the used owned chunks that are in use by the owning node, obtaining a second group of zero or more identifiers corresponding to other used owned chunks that are in use by one or more non-owning nodes of the node cluster, and combining the first group and the second group into the second dataset. Determining the first group of zero or more identifiers corresponding to the used owned chunks that are in use by the owning node can comprise traversing the trees owned by the owning node of the node cluster in a depth first traversal to locate zero or more chunk identifiers corresponding to the used owned chunks in use.

Aspects can comprise, maintaining, by the owning node of the node cluster, a cache of chunk identifiers representing recently added chunks of the used owned chunks in use; determining the first group of zero or more identifiers corresponding to the used owned chunks that are in use by the owning node can comprise accessing the cache to eliminate duplicated chunks in use located during the traversing of the trees.

Combining the first group and the second group into the second dataset can comprise removing duplicated identifiers. Obtaining the second group of zero or more identifiers corresponding to the other used owned chunks that are in use by the one or more non-owning nodes of the node cluster can comprise receiving, from each of the one or more non-owning nodes of the node cluster, a respective data structure containing the zero or more identifiers corresponding to the other used owned chunks that are in use by the one or more non-owning nodes. Aspects can comprise persisting, by the owning node of the node cluster, the respective data structure from each of the one or more non-owning nodes in the node cluster.

Aspects can comprise, performing, by the owning node of the node cluster, reference counting in the node cluster to determine whether a sufficient number of chunks are potentially reclaimable via garbage collection according to a defined sufficiency criterion, and, in response to the sufficient number being determined to be potentially reclaimable and based on the third dataset, scheduling, by the owning node of the node cluster, a garbage collection operation that includes the garbage collecting the unused owned chunks that are not in use in the node cluster.

Aspects can comprise, determining, by the owning node of the node cluster, a fourth dataset representing non-owned chunks that are in use in by the owning node and are owned by other nodes of the node cluster other than the owning node.

Aspects can comprise, partitioning, by the owning node of the node cluster, the fourth dataset into respective lists of chunk identifiers, each respective list of the respective lists corresponding to a respective other node in the node cluster that owns respective chunks identified in the respective list, and, for each respective list, providing, by the owning node of the node cluster, the respective list to the respective other node in the node cluster.

Figure 11:
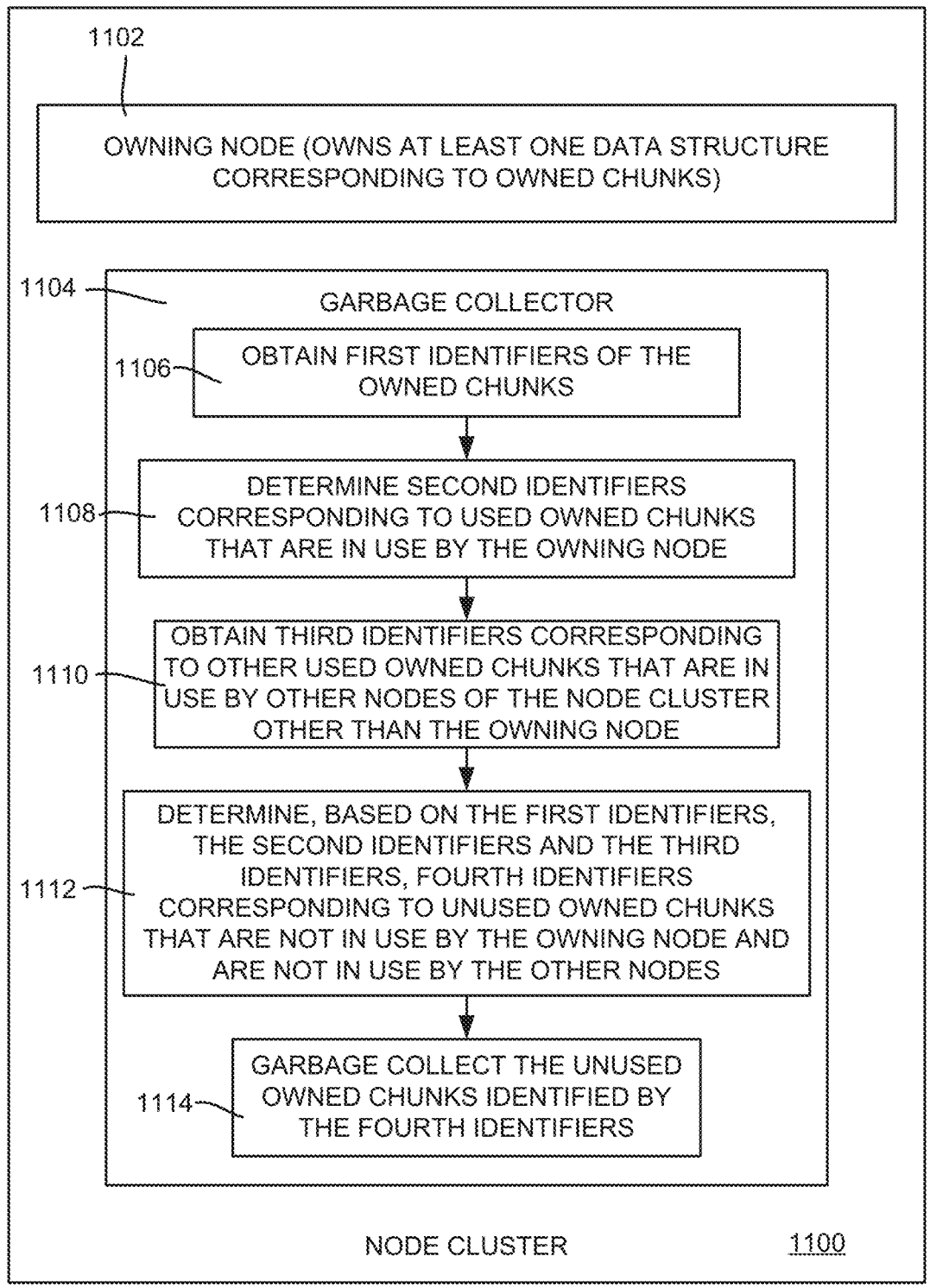
FIG. 11 is a block diagram showing an example node and associated garbage collector that garbage collects node-owned and unused chunks, according to one or more example implementations.

One or more aspects are represented in FIG. 11 as a data storage system and can comprise, in a node cluster 1100, an owning node 1102 that owns at least one data structure corresponding to owned chunks. A garbage collector 1104 can be associated with (e.g., coupled to or incorporated into) the owning node 1102. The garbage collector 1104 can be configured to obtain first identifiers of the owned chunks (block 1106), determine second identifiers corresponding to used owned chunks that are in use by the owning node (block 1108) and obtain third identifiers corresponding to other used owned chunks that are in use by other nodes of the node cluster other than the owning node (block 1110). The garbage collector 1104 can be configured to determine, based on the first identifiers, the second identifiers and the third identifiers, fourth identifiers corresponding to unused owned chunks that are not in use by the owning node and are not in use by the other nodes (block 1112), and garbage collect the unused owned chunks identified by the fourth identifiers (block 1114).

The garbage collector can obtain the third identifiers as data structures received from the other nodes of the node cluster. The garbage collector can union the second identifiers and the third identifiers into a combined dataset. The garbage collector can determine the fourth identifiers based on a difference of the combined dataset from the first identifiers.

The data structure can comprise at least one tree, and the garbage collector can determine the second identifiers corresponding to the used owned chunks that are in use by the owning node by a traversal of the at least one tree owned by the owning node. The garbage collector can eliminate duplicates of the second identifiers obtained during the traversal of the at least one tree owned by the owning node.

Figure 12:
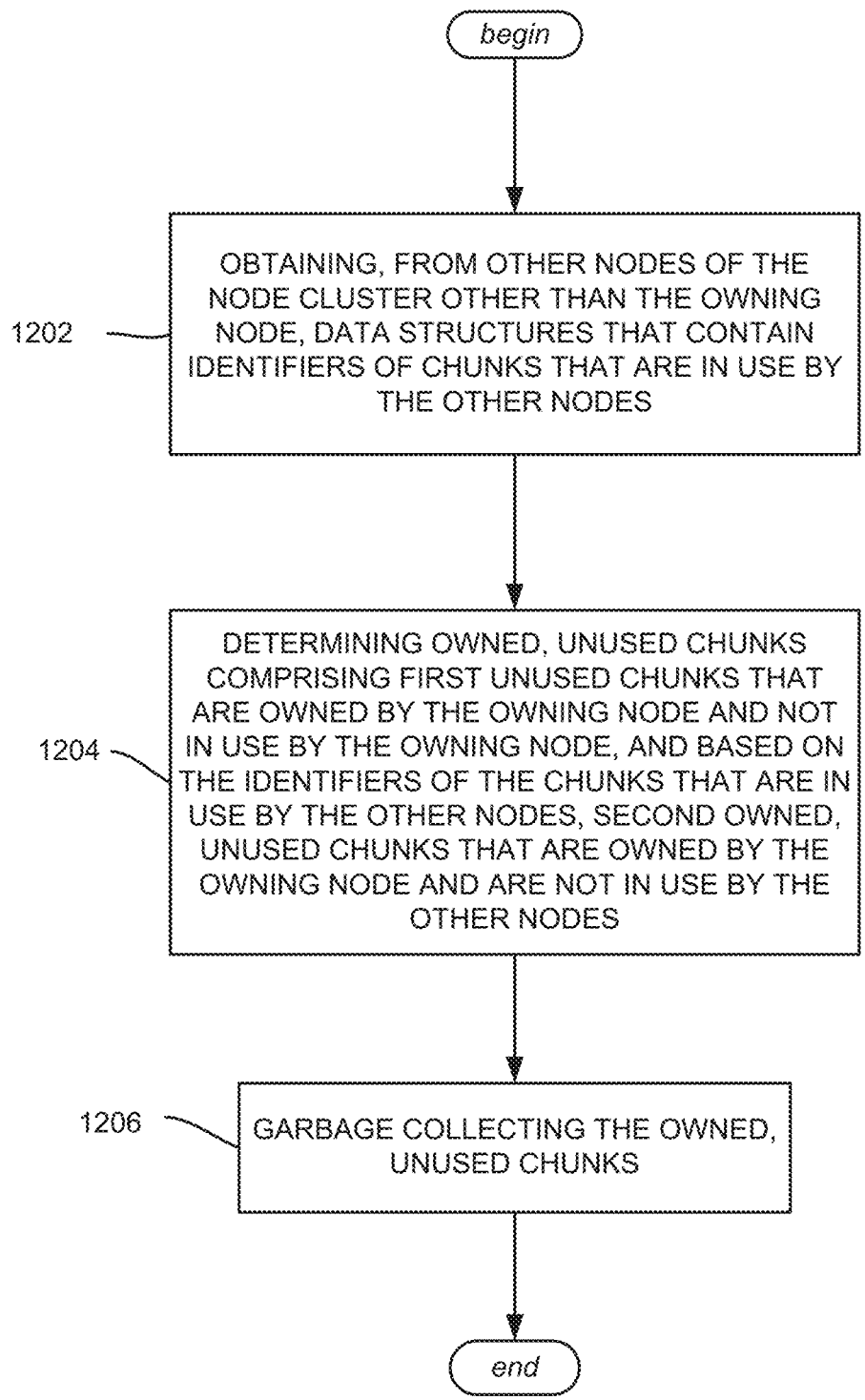
FIG. 12 is a flow diagram showing example operations related to obtaining information on unused chunks at a node and using the information to garbage collect owned, unused chunks, according to one or more example implementations.

One or more aspects, such as implemented in a machine-readable storage medium, comprising executable instructions that, when executed by a processor, facilitate performance of operations, can be directed towards operations exemplified in FIG. 12. Example operation 1202 represents obtaining, from other nodes of the node cluster other than the owning node, data structures that contain identifiers of chunks that are in use by the other nodes. Example operation 1204 represents determining owned, unused chunks comprising first unused chunks that are owned by the owning node and not in use by the owning node, and based on the identifiers of the chunks that are in use by the other nodes, second owned, unused chunks that are owned by the owning node and are not in use by the other nodes. Example operation 1206 represents garbage collecting the owned, unused chunks.

The identifiers can be first identifiers of the chunks that are in use by the other nodes, and determining the owned, unused chunks can comprise determining a first dataset representing second identifiers of chunks that are owned by the owning node and are in use by the owning node, combining the first dataset with the first identifiers of the data structures into a second dataset representing owned chunks that are in use, and determining the owned, unused chunks based on a difference of the second dataset with respect to a third dataset representing a total dataset of owned chunks.

The identifiers can comprise first identifiers of the chunks that are in use by the other nodes, and the data structures can comprise first data structures; aspects can comprise providing second data structures to the other nodes, the second data structures containing second identifiers of chunks that are in use by the owning node and owned by the other nodes.

Aspects can comprise partitioning the second identifiers of the chunks that are in use by the owning node and owned by the other nodes into the second data structures; each second data structure of the second data structures can correspond to one other node of the other nodes that owns one or more trees corresponding to a group of the second identifiers of the chunks in the second data structure for that one other node.

As can be seen, described herein is a technology that garbage collects chunks in a way that increases overall throughput. By having owning nodes garbage collect from chunks they own, the process is able to handle accumulated garbage in one cycle.

Figure 13:
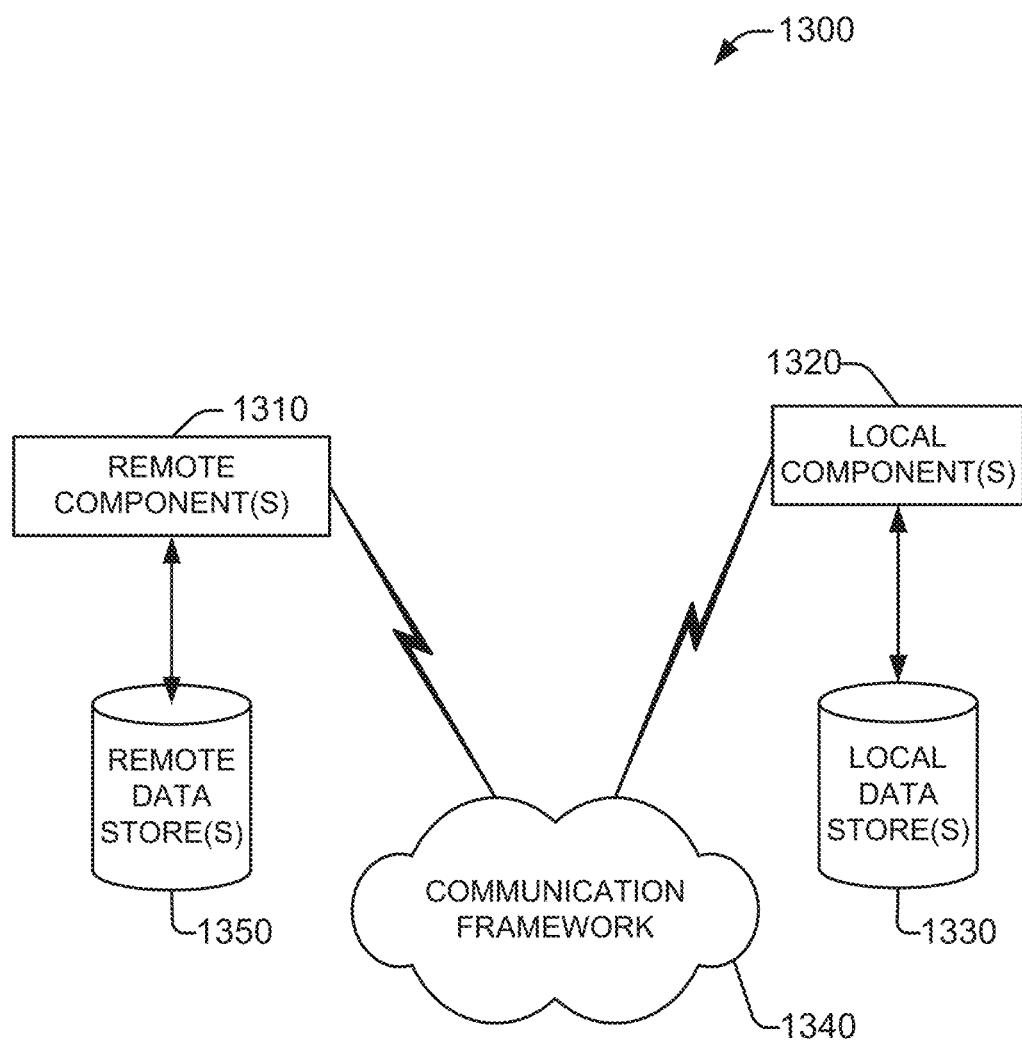
FIG. 13 depicts an example schematic block diagram of a computing environment with which the disclosed subject matter can interact, in accordance with various aspects and implementations of the subject disclosure.

FIG. 13 is a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310 and 1320, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Figure 14:
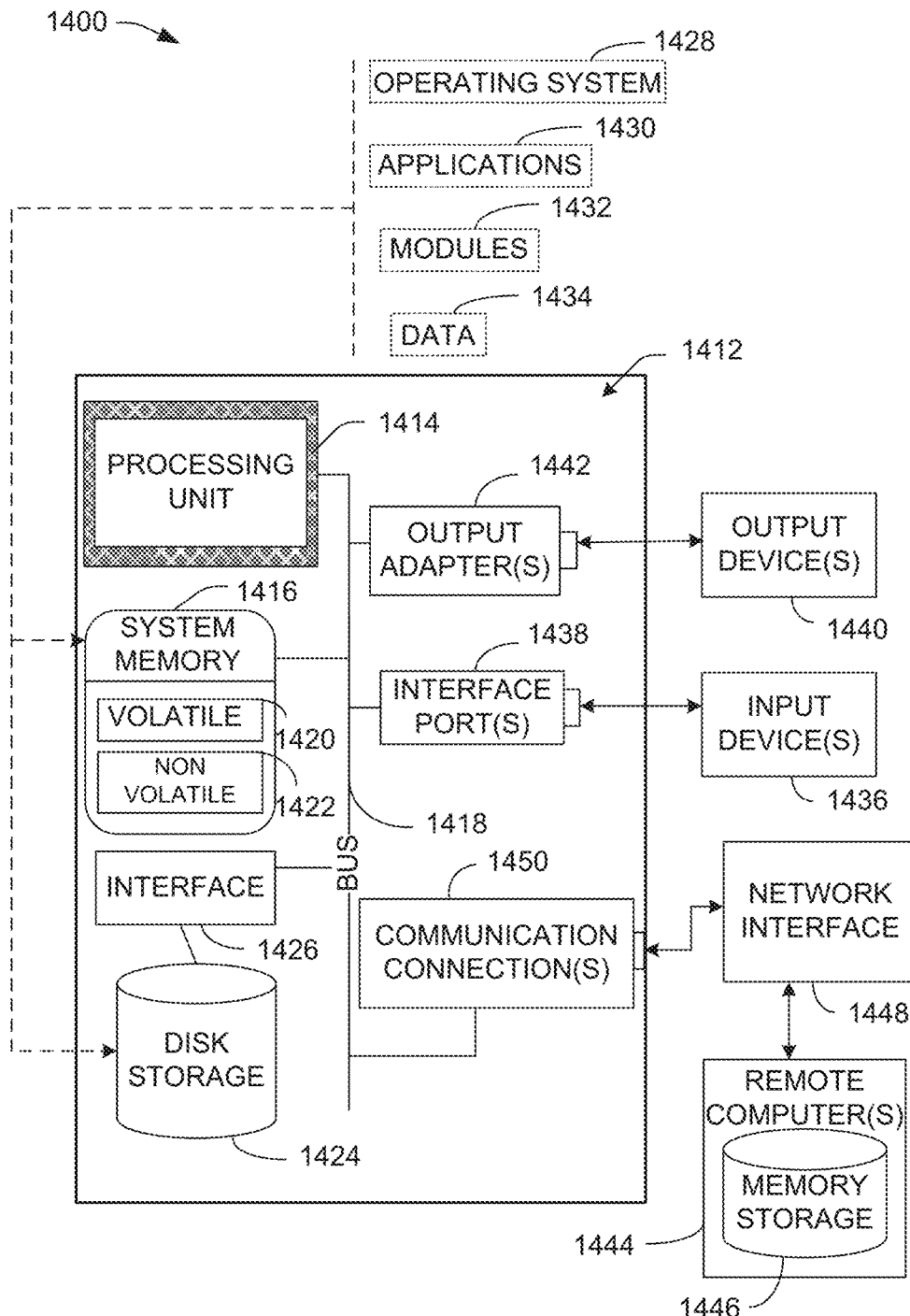
FIG. 14 illustrates an example block diagram of a computing system operable to execute the disclosed systems and methods in accordance with various aspects and implementations of the subject disclosure.

In order to provide a context for the various aspects of the disclosed subject matter, FIG. 14, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1420 (see below), nonvolatile memory 1422 (see below), disk storage 1424 (see below), and memory storage 1446 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 14 illustrates a block diagram of a computing system 1400 operable to execute the disclosed systems and methods in accordance with one or more embodiments/implementations described herein. Computer 1412, can comprise a processing unit 1414, a system memory 1416, and a system bus 1418. System bus 1418 couples system components comprising, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1594), and small computer systems interface.

System memory 1416 can comprise volatile memory 1420 and nonvolatile memory 1422. A basic input/output system, containing routines to transfer information between elements within computer 1412, such as during start-up, can be stored in nonvolatile memory 1422. By way of illustration, and not limitation, nonvolatile memory 1422 can comprise read only memory, programmable read only memory, electrically programmable read only memory, electrically erasable read only memory, or flash memory. Volatile memory 1420 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1412 can also comprise removable/non-removable, volatile/non-volatile computer storage media. FIG. 14 illustrates, for example, disk storage 1424. Disk storage 1424 comprises, but is not limited to, devices like a magnetic disk drive, floppy disk drive, tape drive, flash memory card, or memory stick. In addition, disk storage 1424 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1424 to system bus 1418, a removable or non-removable interface is typically used, such as interface 1426.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 14 describes software that acts as an intermediary between users and computer resources described in suitable operating environment 1400. Such software comprises an operating system 1428. Operating system 1428, which can be stored on disk storage 1424, acts to control and allocate resources of computer system 1412. System applications 1430 take advantage of the management of resources by operating system 1428 through program modules 1432 and program data 1434 stored either in system memory 1416 or on disk storage 1424. It is to be noted that the disclosed subject matter can be implemented with various operating systems or combinations of operating systems.

A user can enter commands or information into computer 1412 through input device(s) 1436. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1412. Input devices 1436 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1414 through system bus 1418 by way of interface port(s) 1438. Interface port(s) 1438 comprise, for example, a serial port, a parallel port, a game port, a universal serial bus, an infrared port, a Bluetooth port, an IP port, or a logical port associated with a wireless service, etc. Output device(s) 1440 use some of the same type of ports as input device(s) 1436.

Thus, for example, a universal serial busport can be used to provide input to computer 1412 and to output information from computer 1412 to an output device 1440. Output adapter 1442 is provided to illustrate that there are some output devices 1440 like monitors, speakers, and printers, among other output devices 1440, which use special adapters. Output adapters 1442 comprise, by way of illustration and not limitation, video and sound cards that provide means of connection between output device 1440 and system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. Remote computer(s) 1444 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1412. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1446 is illustrated with remote computer(s) 1444. Remote computer(s) 1444 is logically connected to computer 1412 through a network interface 1448 and then physically connected by way of communication connection 1450. Network interface 1448 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1450 refer(s) to hardware/software employed to connect network interface 1448 to bus 1418. While communication connection 1450 is shown for illustrative clarity inside computer 1412, it can also be external to computer 1412. The hardware/software for connection to network interface 1448 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising,
   traversing data structures to obtain metadata from a chunk manager, by an owning node of a node cluster and comprising a processor, to determine a first dataset representing owned chunks corresponding to data structures owned by the owning node of the node cluster;
   traversing data structures to obtain data from storage devices, by the owning node of the node cluster, to determine a second dataset representing used owned chunks of the owned chunks that are in use in the node cluster;
   based on a difference between the first dataset and the second dataset, determining, by the owning node of the node cluster, a third dataset representing unused owned chunks of the owned chunks that are not in use in the node cluster;
   based on the third dataset, deleting, by the owning node of the node cluster, unused chunks from storage devices, wherein the unused owned chunks are not in use in the node cluster by the owning node of the node cluster,
   wherein obtaining the data to determine the second dataset representing the owned chunks that are in use in the node cluster comprises determining a first group of identifiers corresponding to the used owned chunks that are in use by the owning node, obtaining a second group of identifiers corresponding to other used owned chunks that are in use by one or more non-owning nodes of the node cluster, and combining the first group and the second group into the second dataset; and
   performing, by the owning node of the node cluster, reference counting in the node cluster to determine whether a sufficient number of chunks are potentially reclaimable via deletion of chunks from storage devices according to a defined sufficiency criterion, and, in response to the sufficient number of chunks being determined to be potentially reclaimable and based on the third dataset, scheduling, by the owning node of the node cluster, a chunk deletion operation that comprises the deleting of the unused owned chunks that are not in use in the node cluster.

2. The method of claim 1, wherein the data structures comprise trees, and wherein the determining the first group of identifiers corresponding to the used owned chunks that are in use by the owning node comprises traversing the trees owned by the owning node of the node cluster in a depth first traversal to locate chunk identifiers corresponding to the used owned chunks in use.

3. The method of claim 2, further comprising, maintaining, by the owning node of the node cluster, a cache of chunk identifiers representing recently added chunks of the used owned chunks in use, wherein the determining the first group of identifiers corresponding to the used owned chunks that are in use by the owning node comprises accessing the cache to eliminate duplicated chunks in use located during the traversing of the trees.

4. The method of claim 3, wherein the trees comprise B+ trees.

5. The method of claim 1, wherein the combining the first group and the second group into the second dataset comprises removing duplicated identifiers.

6. The method of claim 1, wherein the obtaining the second group of identifiers corresponding to the other used owned chunks that are in use by the one or more non-owning nodes of the node cluster comprises receiving, from each of the one or more non-owning nodes of the node cluster, a respective data structure containing the identifiers corresponding to the other used owned chunks that are in use by the one or more non-owning nodes.

7. The method of claim 6, further comprising, persisting, by the owning node of the node cluster, the respective data structure from each of the one or more non-owning nodes in the node cluster.

8. The method of claim 1, further comprising, determining, by the owning node of the node cluster, a fourth dataset representing non-owned chunks that are in use in by the owning node and are owned by other nodes of the node cluster other than the owning node.

9. The method of claim 8, further comprising, partitioning, by the owning node of the node cluster, the fourth dataset into respective lists of chunk identifiers, each respective list of the respective lists corresponding to a respective other node in the node cluster that owns respective chunks identified in the respective list, and, for each respective list, providing, by the owning node of the node cluster, the respective list to the respective other node in the node cluster.

10. The method of claim 1, wherein the data structures are first data structures, the method further comprising:
providing second data structures to other nodes, other than the owning node, the second data structures containing second identifiers of chunks that are in use by the owning node and owned by the other nodes.

11. A system, comprising:
a garbage collector, comprising a processor and associated with an owning node, in a node cluster, that owns at least one data structure corresponding to owned chunks, the garbage collector configured to:
obtain first identifiers of the owned chunks;
traverse data structures to obtain data from storage services to determine second identifiers corresponding to used owned chunks that are in use by the owning node;
obtain third identifiers from storage corresponding to other used owned chunks that are in use by other nodes of the node cluster other than the owning node;
determine, based on the first identifiers, the second identifiers and the third identifiers, fourth identifiers corresponding to unused owned chunks that are not in use by the owning node and are not in use by the other nodes;
delete from the storage the unused owned chunks identified by the fourth identifiers;
combine the second identifiers and the third identifiers, wherein the combining results in a combined dataset; and
perform, by the owning node of the node cluster, reference counting in the node cluster to determine whether a sufficient number of chunks are potentially reclaimable via deletion of chunks from storage devices according to a defined sufficiency criterion, and, in response to the sufficient number of chunks being determined to be potentially reclaimable and based on the third dataset, schedule, by the owning node of the node cluster, a chunk deletion operation that comprises the deleting of the unused owned chunks that are not in use in the node cluster.

12. The system of claim 11, wherein the garbage collector obtains the third identifiers from the storage as data structures received from the other nodes of the node cluster.

13. The system of claim 11, wherein the garbage collector determines the fourth identifiers based on a difference of the combined dataset from the first identifiers.

14. The system of claim 11, wherein the data structure comprises at least one tree, and wherein the garbage collector traverses data structures to obtain data from storage devices to determine the second identifiers corresponding to the used owned chunks that are in use by the owning node by a traversal of the at least one tree owned by the owning node.

15. The system of claim 14, wherein the garbage collector eliminates duplicates of the second identifiers obtained during the traversal of the at least one tree owned by the owning node.

16. The system of claim 11, wherein the garbage collector is further configured to:
reclaim storage space occupied by the unused owned chunks identified by the fourth identifiers.

17. A non-transitory machine-readable medium, comprising executable instructions that, when executed by a processor of an owning node of a node cluster, facilitate performance of operations, the operations comprising:
obtaining, from storage devices, data structures that contain first identifiers of chunks that are in use by other nodes of the node cluster other than the owning node;
determining first owned, unused chunks comprising first unused chunks that are owned by the owning node and not in use by the owning node, and based on the first identifiers of the chunks that are in use by the other nodes, second owned, unused chunks that are owned by the owning node and are not in use by the other nodes;
deleting the first owned, unused chunks from the storage devices associated with the node cluster,
wherein the determining the first owned, unused chunks comprises determining a first dataset representing second identifiers of chunks that are owned by the owning node and are in use by the owning node, combining the first dataset with the first identifiers of the data structures into a second dataset representing owned chunks that are in use, and determining the first owned, unused chunks based on a difference of the second dataset with respect to a third dataset representing a total dataset of owned chunks corresponding to trees owned by the owning node; and
performing, by the owning node of the node cluster, reference counting in the node cluster to determine whether a sufficient number of chunks are potentially reclaimable via deletion of chunks from storage devices according to a defined sufficiency criterion, and, in response to the sufficient number of chunks being determined to be potentially reclaimable and based on the third dataset, scheduling, by the owning node of the node cluster, a chunk deletion operation that comprises the deleting of the unused owned chunks that are not in use in the node cluster.

18. The non-transitory machine-readable medium of claim 17, wherein the data structures are first data structures, and wherein the operations further comprise, providing second data structures to the other nodes, the second data structures containing second identifiers of chunks that are in use by the owning node and owned by the other nodes.

19. The non-transitory machine-readable medium of claim 18, wherein the operations further comprise, partitioning the second identifiers of the chunks that are in use by the owning node and owned by the other nodes into the second data structures, and wherein each second data structure of the second data structures corresponds to one other node of the other nodes that owns one or more trees corresponding to a group of the second identifiers of the chunks in the second data structure for that one other node.

20. The non-transitory machine-readable medium of claim 17, wherein the trees comprise B+ trees.

* * * * *